(12) United States Patent
Pinjani (10) Patent No.: US 9,317,821 B2
(45) Date of Patent: Apr. 19, 2016

(54) SYSTEM FOR ANALYZING DEVICE PERFORMANCE DATA

(75) Inventor: Nidhi Pinjani, New Castle, DE (US)

(73) Assignee: Bank of America Corporation, Charlotte, NC (US)

( * ) Notice: Subject to any disclaimer, the term of this patent is extended or adjusted under 35 U.S.C. 154(b) by 521 days.

(21) Appl. No.: 13/196,142

(22) Filed: Aug. 2, 2011

(65) Prior Publication Data

US 2013/0036125 A1    Feb. 7, 2013

(51) Int. Cl.
G06F 17/30        (2006.01)
G06Q 10/06        (2012.01)

(52) U.S. Cl.
CPC ..................................... *G06Q 10/06* (2013.01)

(58) Field of Classification Search
CPC ................................................ G06F 17/30557
USPC .......................................................... 707/754
See application file for complete search history.

(56) References Cited

U.S. PATENT DOCUMENTS

| | | | | |
|---|---|---|---|---|
| 4,863,037 | A * | 9/1989 | Stevens et al. ............... | 53/381.3 |
| 5,077,694 | A * | 12/1991 | Sansone et al. ............... | 705/406 |
| 5,651,445 | A * | 7/1997 | Stevens et al. ................ | 198/447 |
| 6,697,500 | B2 * | 2/2004 | Woolston et al. ............. | 382/101 |
| 8,311,668 | B2 * | 11/2012 | Lee et al. ....................... | 700/226 |
| 2002/0169519 | A1 * | 11/2002 | Ferrara et al. ................. | 700/224 |
| 2006/0260989 | A1 * | 11/2006 | Chamblee et al. ............ | 209/584 |
| 2007/0204007 | A1 * | 8/2007 | Ashaari et al. ................ | 709/217 |
| 2008/0291486 | A1 * | 11/2008 | Isles et al. ..................... | 358/1.15 |
| 2009/0070338 | A1 * | 3/2009 | Spitzig et al. ................. | 707/10 |
| 2011/0046775 | A1 * | 2/2011 | Bailey et al. .................. | 700/224 |
| 2013/0031183 | A1 * | 1/2013 | Kumar et al. ................. | 709/206 |
| 2014/0096477 | A1 * | 4/2014 | Sussmeier et al. ............ | 53/53 |

OTHER PUBLICATIONS

U.S. Appl. No. 13/196,112, filed Aug. 2, 2011, entitled, "System for Analyzing Device Performance Data".
U.S. Patent and Trademark Office Official Action in U.S. Appl. No. 13/196,112, dated Feb. 4, 2013, 12 pages.
U.S. Patent and Trademark Office Official Action in U.S. Appl. No. 13/196,112, dated Sep. 16, 2013, 20 pages.

* cited by examiner

*Primary Examiner* — James Trujillo
*Assistant Examiner* — Kurt Mueller
(74) *Attorney, Agent, or Firm* — Michael A. Springs (57) ABSTRACT

A system for analyzing performance data associated with a mail processing device includes a reporting module operable to receive, over a network, first data related to the operation of a mail processing device at one of a plurality of mail processing sites, wherein each of the plurality of mail processing sites is associated with a database accessible over the network, store the first data in a database associated with the mail processing site of the mail processing device, receive, over the network, second data identifying filter criteria for the first data, filter, using a processor, the first data with the second data, generate, using a processor, a report based on the filtered first data, and communicate the report over the network.

15 Claims, 7 Drawing Sheets

FIG. 1

| | 202 | 204 | 206 | 208 | 210 | 212 | 214 | 216 | 218 | 220 | 222 | 224 | 226 | 228 | 230 | 232 | 234 |
|---|---|---|---|---|---|---|---|---|---|---|---|---|---|---|---|---|---|
| | Date | Job Name | Job Type | Job Time | Operator | Manager | Device | Customer | Product | Input | Output | Outsort | Reunite | Rejects | Jams | Jam Clear Rate | Device Idle Time |
| 236 | 1/1/11 | 0001 | Job 1 | 02:53:58 | Oper1 | Manag1 | Dev1 | Cust1 | Prod1 | 27264 | 26235 | 1029 | 266 | 612 | 42 | 00:00:14 | 00:06:32 |
| | 1/2/11 | 0023 | Job 2 | 03:39:07 | Oper1 | Manag1 | Dev1 | Cust2 | Prod2 | 35392 | 34295 | 1097 | 380 | 837 | 52 | 00:00:11 | 00:05:58 |
| | 1/2/11 | 0036 | Job 2 | 01:46:57 | Oper2 | Manag1 | Dev3 | Cust6 | Prod4 | 13240 | 13017 | 223 | 439 | 661 | 28 | 00:00:12 | 00:06:04 |

Report Selection

Start Date: 2/17/2011
End Date: 2/17/2011

☐ Select Manager Name   ☐ Select Employee Name(s)

Manager 1          Employee 1
Manager 2          Employee 2
  .                  .
  .                  .
  .                  .
Manager 5          Employee 8

Individual Operator Reports | Summary Reports
☐ Product, Customer and Job Type | ☐ Product, Customer Job Type
☐ Product | ☐ Manager Aggregate
☐ Customer | ☐ Manager Aggregate
☐ Job Type |    By Device
☐ Device and Job Type |

[ View Reports ]

[ Product Report by Half Hour ]   [ Output Volumes by Month ]   [ 14 day Chart ]

[ Product Report By Date ]   [ More Reports ]   [ EPMS Reports ]

Start date: 1/1/2011
End date: 1/31/2011

Daily Report  Customer ▼
Summary     Product ▼
Reunite, Rejects and Outsorts
Percentages based on Input and Output.

Jam Clear Rate Report          Job Type: Consumer ▼
Remaining Idle Time Report     Device Type: Eagle ▼

Eagle17
Eagle45

Create chart report based on date range.

Product 1
Product 2
. . .
Product 6

● Out Sort Rates
○ Jam Rates
○ Reunites Rates
○ Rejects Rates
○ Effective Output Rates
○ All Reports View/Print Send data to Excel file.
H:\Test.xlsx Select Excel file to export to
Export data to File Close

*FIG. 4B*

Operator Productivity Report
Work of: 1/1/2011 Thru 1/31/2011 Site 1 Managers Aggregate Report

| | Input | Output | Enterprise Effective Throughput (Items per Hr) | Vendor Effective Throughput | Jam Rate | Average Remaining idle Time | Jam Clear Rate | Stops | Jams | Run Time | Jam Time | Idle Time | Total Device Time |
|---|---|---|---|---|---|---|---|---|---|---|---|---|---|
| Device 1 | | | | | | | | | | | | | |
| Device1-01 Total | 109,753 | 108,505 | 1,669 | 1,389 | 133 | 00:33:46 | 11 | 137 | 824 | 62:25:49 | 02:34:06 | 13:05:16 | 64:59:55 |
| Device1-02 Total | 132,876 | 131,161 | 1,706 | 1,232 | 150 | 01:41:45 | 6 | 126 | 881 | 75:13:41 | 01:37:49 | 29:35:15 | 76:51:30 |
| Device1-03 Total | 98,342 | 97,308 | 1,682 | 1,247 | 171 | 01:33:51 | 4 | 106 | 575 | 57:09:55 | 00:39:15 | 20:09:09 | 57:49:11 |
| Device1-04 Total | 138,953 | 137,084 | 1,809 | 1,267 | 150 | 01:46:54 | 7 | 171 | 924 | 73:57:38 | 01:47:54 | 32:21:09 | 75:45:32 |
| Device1-05 Total | 129,396 | 127,546 | 1,688 | 1,171 | 128 | 01:55:37 | 4 | 209 | 1,004 | 74:21:50 | 01:11:32 | 33:19:43 | 75:33:22 |
| Device1-06 Total | 132,673 | 130,797 | 1,497 | 1,040 | 127 | 02:12:22 | 9 | 292 | 1,042 | 84:37:20 | 02:43:28 | 38:22:33 | 87:20:48 |
| Device1-07 Total | 126,772 | 125,253 | 1,673 | 1,204 | 150 | 01:46:15 | 6 | 107 | 842 | 73:15:23 | 01:36:24 | 29:07:16 | 74:51:47 |
| Device1-08 Total | 123,575 | 122,210 | 1,842 | 1,227 | 176 | 02:14:50 | 6 | 89 | 702 | 66:07:09 | 01:12:24 | 33:14:52 | 66:19:33 |
| Device 1 Summary | 992,340 | 979,864 | 1,680 | 1,211 | 146 | 01:44:45 | 7 | 1,237 | 6,794 | 555:08:46 | 13:22:52 | 229:15:13 | 579:31:38 |
| Device 2 | | | | | | | | | | | | | |
| Device2-01 Total | 900,272 | 871,313 | 8,619 | | 706 | 00:07:17 | 17 | 628 | 1,274 | 71:00:41 | 06:16:32 | 23:48:05 | 101:05:18 |
| Device2-02 Total | 722,922 | 705,617 | 8,244 | | 625 | 00:05:27 | 27 | 673 | 1,156 | 57:41:20 | 08:53:02 | 19:01:01 | 85:35:23 |
| Device 2 Summary | 1,623,194 | 1,576,930 | 8,447 | | 667 | 00:06:28 | 22 | 1,301 | 2,430 | 128:42:01 | 15:09:34 | 42:49:06 | 186:40:41 |
| Device 3 | | | | | | | | | | | | | |
| Device3-01 Total | 463,160 | 460,128 | 29,729 | | 10,771 | 00:10:30 | 106 | 192 | 43 | 14:12:38 | 01:16:00 | 09:29:48 | 15:28:38 |
| Device3-02 Total | 1,822,430 | 1,807,233 | 32,918 | | 32,543 | 00:08:37 | 109 | 751 | 56 | 53:11:27 | 01:42:32 | 30:48:07 | 54:53:59 |
| Device 3 Summary | 2,285,590 | 2,267,361 | 32,217 | | 23,085 | 00:09:00 | 108 | 943 | 99 | 67:24:05 | 02:58:32 | 40:17:55 | 70:22:37 |

*FIG. 5A*

Operator Productivity Report  
Work of: 1/1/2011 Thru 1/31/2011  Site 1  Report by Product  Manager: Manager

| Employee Name | Input | Output | Enterprise Effective Throughput (Items per Hr) | Vendor Effective Throughput | Jam Rate | Average Remaining Idle Time | Jam Clear Rate | Stops | Jams | Run Time | Jam Time | Idle Time | Total Device Time |
|---|---|---|---|---|---|---|---|---|---|---|---|---|---|
| Operator 1 | | | | | | | | | | | | | |
| Device 1 | | | | | | | | | | | | | |
| Product 1 Total | 6,608 | 6,508 | 1,148 | 563 | 113 | 02:00:49 | 10 | 21 | 37 | 05:30:45 | 00:09:45 | 01:31:38 | 05:40:30 |
| Product 2 Total | 2,245 | 2,221 | 1,348 | 890 | 187 | 03:24:33 | 6 | | 12 | 01:37:33 | 00:01:18 | 00:50:50 | 01:38:51 |
| Device 1 Summary | 8,853 | 8,729 | 1,192 | 870 | 128 | 02:22:07 | 9 | 21 | 59 | 07:08:18 | 00:11:03 | 02:42:28 | 07:19:21 |
| Device 2 | | | | | | | | | | | | | |
| Product 1 Total | 44,614 | 43,636 | 6,408 | | 384 | 00:07:33 | 43 | 58 | 116 | 03:38:22 | 01:23:40 | 01:45:29 | 06:43:31 |
| Product 2 Total | 6,149 | 5,884 | 8,717 | | 768 | 00:02:05 | 41 | 5 | 8 | 00:28:23 | 00:05:32 | 00:06:35 | 00:40:30 |
| Device 2 Summary | 50,763 | 49,520 | 6,517 | | 409 | 00:06:54 | 43 | 63 | 124 | 04:07:45 | 01:29:12 | 01:52:04 | 07:29:01 |
| Total | 59,616 | 58,249 | 3,934 | 3,005 | 308 | 00:27:30 | 31 | 84 | 183 | 11:16:03 | 01:40:15 | 04:34:32 | 14:48:22 |
| Summary for Operator 1 (7 detail records) | | | | | | | | | | | | | |
| Site Summary | | | | | | | | | | | | | |
| Device 1 | 992,340 | 979,864 | 1,890 | 1,211 | 145 | 01:44:45 | 7 | 1,237 | 6,794 | 555:06:45 | 13:22:52 | 229:15:13 | 879:31:38 |
| Device 2 | 1,623,194 | 1,576,930 | 8,447 | 667 | 667 | 00:06:28 | 22 | 1,301 | 2,490 | 123:42:01 | 15:09:34 | 42:49:05 | 185:40:41 |
| Device 3 | 2,285,580 | 2,267,361 | 32,217 | 23,085 | 22,035 | 00:09:00 | 108 | 943 | 99 | 67:24:05 | 02:58:32 | 40:17:55 | 70:22:37 |

*FIG. 5B*

Operator Productivity Report
Work of: 1/1/2011 Thru 1/31/2011  Site 1    Managers Aggregate Report

504

| Manager Name | Input | Output | Enterprise Effective Throughput (Items per Hr) | Vendor Effective Throughput | Jam Rate | Average Remaining Idle Time | Jam Clear Rate | Stops | Jams | Run Time | Jam Time | Idle Time | Total Device Time |
|---|---|---|---|---|---|---|---|---|---|---|---|---|---|
| Manager | | | | | | | | | | | | | |
| Device 1 Summary | 8,579 | 8,499 | 1,043 | 720 | 155 | 03:44:59 | 7 | 8 | 55 | 08:01:39 | 00:07:09 | 03:38:46 | 08:08:48 |
| Manager | | | | | | | | | | | | | |
| Device 1 Summary | 4,424 | 4,407 | 2,059 | 1,379 | 442 | 02:09:27 | 6 | 5 | 10 | 02:07:23 | 00:01:01 | 01:03:18 | 02:08:24 |
| Manager | | | | | | | | | | | | | |
| Device 1 Summary | 514,822 | 508,039 | 1,585 | 1,088 | 142 | 02:15:49 | 8 | 598 | 3,602 | 312:01:11 | 08:26:19 | 146:21:05 | 320:27:30 |
| Device 2 Summary | 1,373,818 | 1,335,038 | 8,539 | | 700 | 00:06:37 | 18 | 1,062 | 1,561 | 103:58:21 | 10:03:51 | 36:23:55 | 155:25:07 |
| Device 3 Summary | 2,117,740 | 2,100,204 | 32,181 | 22,529 | 00:09:06 | 111 | 867 | 94 | 62:20:38 | 02:55:08 | 37:40:04 | 65:15:44 |
| Manager | | | | | | | | | | | | | |
| Device 1 Summary | 454,815 | 458,919 | 1,844 | 1,403 | 148 | 01:05:48 | 5 | 626 | 3,127 | 243:58:33 | 04:48:23 | 78:12:04 | 248:46:55 |
| Device 2 Summary | 249,376 | 241,894 | 7,738 | | 537 | 00:03:44 | 38 | 238 | 469 | 19:46:40 | 05:03:43 | 06:25:11 | 32:15:34 |
| Device 3 Summary | 167,850 | 167,157 | 32,681 | 33,570 | 00:07:43 | 40 | 76 | 5 | 05:03:29 | 00:03:24 | 02:37:61 | 05:06:53 |
| Site Summary | | | | | | | | | | | | | |
| Device 1 | 992,340 | 979,964 | 1,690 | 1,211 | 146 | 01:44:45 | 7 | 1,237 | 6,794 | 566:08:45 | 13:22:52 | 229:15:13 | 579:31:38 |
| Device 2 | 1,623,194 | 1,578,930 | 3,447 | | 667 | 00:06:28 | 22 | 1,301 | 2,430 | 128:42:01 | 15:09:34 | 42:49:08 | 186:40:41 |
| Device 3 | 2,285,590 | 2,267,361 | 32,217 | 20,496 | 23,086 | 00:09:00 | 105 | 943 | 89 | 67:24:05 | 02:58:32 | 40:17:55 | 70:22:37 |

*FIG. 5C*

SYSTEM FOR ANALYZING DEVICE PERFORMANCE DATA

TECHNICAL FIELD

This invention relates generally device performance and more particularly to analyzing mail processing device performance.

BACKGROUND OF THE INVENTION

Enterprises often send and receive large volumes of mail. Enterprises may utilize high volume mail processing devices to automate mail processing tasks such as opening envelopes, removing correspondence from envelopes, capturing data, folding paper, inserting correspondence into envelopes, sealing envelopes, and applying postage to envelopes. In some circumstances, enterprises may employ vendors to supply mail processing devices and/or support services for mail processing devices.

SUMMARY OF THE INVENTION

According to embodiments of the present disclosure, disadvantages and problems associated with analyzing mail processing device performance may be reduced or eliminated.

In certain embodiments, a system for analyzing performance data associated with a mail processing device includes a reporting module operable to receive, over a network, first data related to the operation of a mail processing device at one of a plurality of mail processing sites, wherein each of the plurality of mail processing sites is associated with a database accessible over the network, store the first data in a database associated with the mail processing site of the mail processing device, receive, over the network, second data identifying filter criteria for the first data, filter, using a processor, the first data with the second data, generate, using a processor, a report based on the filtered first data, and communicate the report over the network.

In certain embodiments, a non-transitory computer readable medium includes logic for analyzing performance data associated with a mail processing device, the logic, when executed by a processor, operable to receive, over a network, first data related to the operation of a mail processing device at one of a plurality of mail processing sites, wherein each of the plurality of mail processing sites is associated with a database accessible over the network, store the first data in a database associated with the mail processing site of the mail processing device, receive, over the network, second data identifying filter criteria for the first data, filter, using a processor, the first data with the second data, generate, using a processor, a report based on the filtered first data, and communicate the report over the network.

In certain embodiments, a method for analyzing performance data associated with a mail processing device includes receiving, over a network, first data related to the operation of a mail processing device at one of a plurality of mail processing sites, wherein each of the plurality of mail processing sites is associated with a database accessible over the network, storing the first data in a database associated with the mail processing site of the mail processing device, receiving, over the network, second data identifying filter criteria for the first data, filtering, using a processor, the first data with the second data, generating, using a processor, a report based on the filtered first data, and communicate the report over the network.

Certain embodiments of the present disclosure may provide one or more technical advantages. A technical advantage of an embodiment includes providing an enterprise with the ability to automate collection of performance data from mail processing devices, or from a mail services vendor's database, to dynamically manipulate the performance data with filter criteria, to supplement the performance data with data collected from other sources, and to generate reports from the manipulated performance data. Additionally, the system may allow the enterprise to identify maintenance issues in mail processing devices, train and evaluate operators and managers, track mail processing costs, and otherwise use mail processing device performance data to improve enterprise mail processing.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
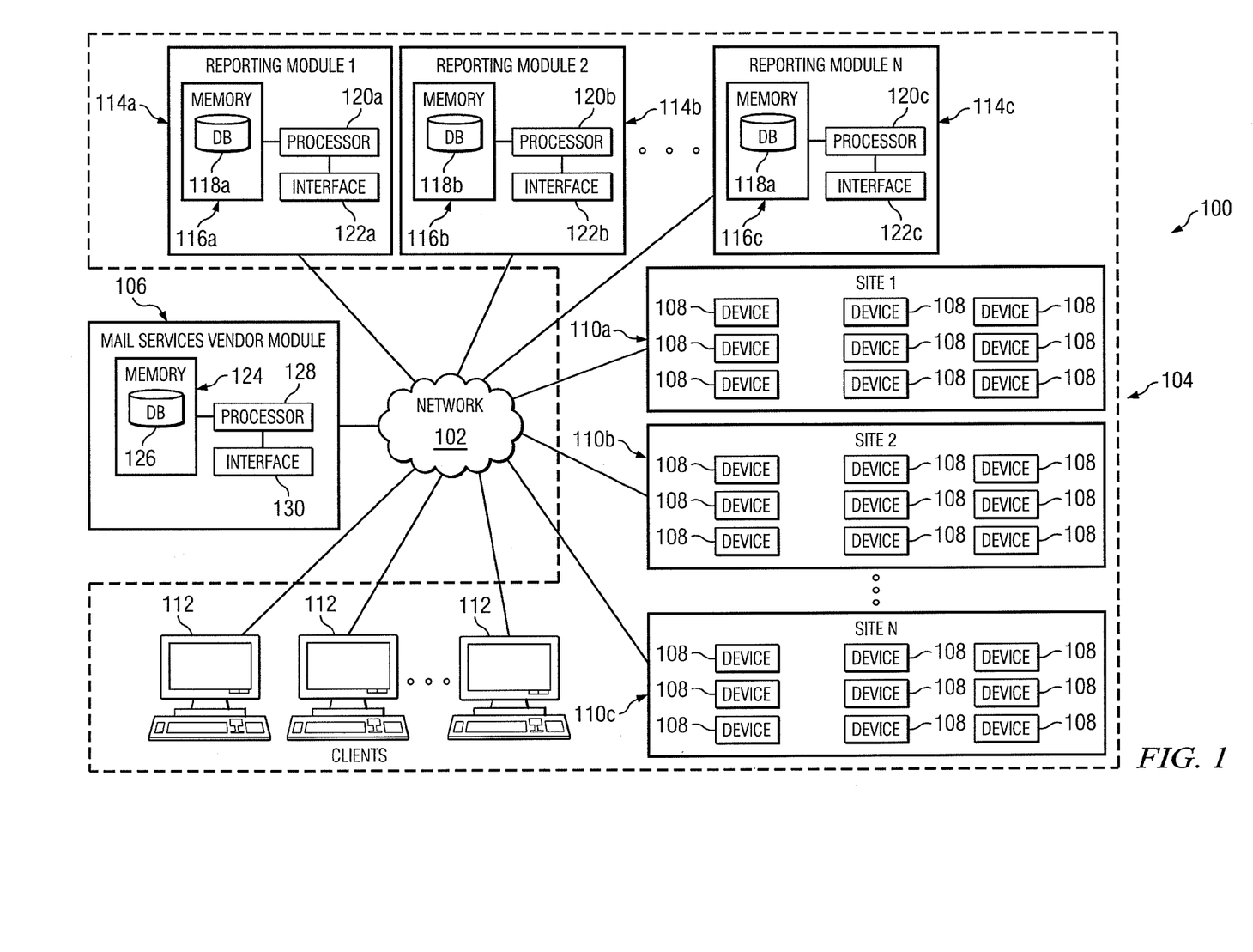
FIG. 1 illustrates a block diagram of an embodiment of a system for analyzing the performance of mail processing devices.

FIG. 1 illustrates a block diagram of an embodiment of a system 100 for analyzing the performance of mail processing devices 108. According to an embodiment of the present disclosure, system 100 includes network 102 and enterprise 104. Enterprise 104 may include a number of mail processing devices 108 at one or more mail processing sites 110, one or more clients 112, and one or more reporting modules 114 comprising memory 116, database 118, processor 120, and interface 122. In certain embodiments, system 100 further includes mail services vendor module 106. Mail services vendor module 106 may comprise memory 124, database 126, processor 128, and interface 130. In an embodiment, mail processing devices 108, reporting modules 114, mail services vendor module 106, and clients 112 are communicatively coupled to network 102.

Enterprise 104 includes a plurality of mail processing devices 108 at one or more mail processing sites 110 and one or more reporting modules 114, each reporting module 114 including database 118 associated with a mail processing site 110. For example, database 118a of reporting module 114a may be associated with mail processing site 110a. Mail processing devices 108 may record first data related to the operation of mail processing devices 108 and communicate the first data over network 102. Other components of system 100, for example, mail services vendor module 106 and/or reporting modules 114 may receive and store first data. Clients 112 may communicate second data that identifies filtering criteria for first data over network 102. In an embodiment, reporting module 114a receives first data related to mail processing devices 108 at mail processing site 110a associated with database 118a of reporting module 114a from network 102, and receives second data from network 102, filters the first data with the filtering criteria identified by the second data, generates a report based on the filtered first data, and communicates the report over network 102. In an embodiment, mail services vendor module 106 receives first data from network 102 and reporting modules 114 access first data from network 102 through mail services vendor module 106. In another embodiment, reporting modules 114 receive first data from network 102 without using mail services vendor module 106.

According to certain embodiments of the present disclosure, system 100 provides enterprise 104 with the ability to automate collection of performance data (e.g., first data) from mail processing devices 108, or from a mail services vendor's database 126, to dynamically manipulate the performance data with filter criteria (e.g., second data), to supplement the performance data with data collected from other sources, and to generate reports from the manipulated performance data. For example, enterprise 104 may develop custom reports to evaluate mail processing device 108, operator, manager, and/or maintenance performance based on data collected at mail processing devices 108. Additionally, system 100 may allow enterprise 104 to identify maintenance issues in mail processing devices 108, train and evaluate operators and managers, track mail processing costs, and otherwise use mail processing device 108 performance data to improve enterprise 104 mail processing.

Network 102 represents any suitable network operable to facilitate communication between components of system 100, such as mail processing devices 108, mail services vendor module 106, reporting module 114, and clients 112. Network 102 may include any interconnecting system capable of transmitting audio, video, electrical signals, optical signals, data, messages, or any combination of the preceding. Network 102 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Enterprise 104 represents an entity that operates mail processing devices. Enterprise 104 may refer to a financial institution, such as a bank, however, enterprise 104 represents any suitable type of entity in any suitable industry. Enterprise 104 may have different business units, or subdivisions, that handle different business activities, for example, mail processing. In an embodiment, enterprise 104 includes one or more mail processing sites 110 comprising a number of mail processing devices 108, one or more clients 112, and one or more reporting modules 114 comprising databases 118 associated with the one or more mail processing sites 110. In an embodiment, each mail processing site 110 is associated with a database 118 of a reporting module 114. For example, in the illustrated embodiment, mail processing site 110a is associated with database 118a of reporting module 114a, mail processing site 110b is associated with database 118b of reporting module 114a, and mail processing site 110n is associated with database 118n of reporting module 114n, where N represents the number of mail processing sites 110. In another embodiment, each mail processing site 110 is associated with a database 118 of one or more reporting modules 114. For example reporting module 114 may comprise a plurality of databases 118, each database 118 associated with one or more mail processing sites 110.

Mail processing device 108 represents a machine, device, or apparatus operable to perform mail processing functions. Mail processing functions include opening mail packaging, removing mail from mail packaging, scanning mail, imaging mail, capturing data from mail, transmitting mail within enterprise 104, outsorting mail, inserting mail into mail packaging, packaging mail, applying postage to mail, and/or any other processing involved in transmitting or receiving mail. Mail represents any tangible item that may be sent through mail services such as the United States Postal Service, the United Parcel Service, Federal Express, DHL, or any other mail services provider. Mail processing devices 108 include mail openers, mail extractors, mail sorters, mail joggers, payment processing equipment, mail inserters, mail sealers, tabbers, paper folders, imaging devices, scanning devices, data capture devices, and/or any other device, machine, or apparatus operable to automate processing involved in transmitting or receiving mail. The items processed by mail processing devices 108 may be referred to as articles. Articles include envelopes, documents, bills, checks, payment information, or other items that may be mailed to, or mailed from, enterprise 104. In an embodiment, mail processing devices 108 are equipped to record and/or communicate data related to the operation of mail processing devices 108. Mail processing devices 108 may be located at mail processing sites 110 in enterprise 104. Mail processing site 110 represents a location where mail processing devices 108 operate.

Clients 112 represent entities that communicate data, such as filtering data (e.g., second data), to system 100. Clients 112 may further be operable to receive reports generated by system 100. In particular embodiments, clients 112 represent general or special-purpose computers communicating with software applications capable of performing the above-described operations. Additionally, in particular embodiments, client 112 may include one or more processors operable to execute computer logic and/or software encoded on non-transitory tangible media that performs the described functionality. Clients 112 may include, but are not limited to, laptop computers, desktop computers, personal digital assistants (PDAs), mobile phones, tablets, and/or portable media players. In some embodiments, client 112 comprises one or more of a general-purpose personal computer (PC), a Macintosh, a workstation, a Unix-based computer, a server computer, or any suitable processing device. Client 112 may also include one or more computer input devices, such as a keyboard, trackball, or a mouse, and/or one or more Graphical User Interfaces (GUIs), through which a user may interact with the logic operating on a processor communicating with client 112. In general, client 112 includes any appropriate combination of hardware, software, and/or encoded logic suitable to perform the described functionality. Clients 112 may couple to network 102 through a dedicated wired or wireless connection, or may connect to network 102 only as needed to receive, transmit, or otherwise execute applications. In certain embodiments, clients 112 may share elements and/or functionality with other components of system 100, for example, when a software application operates on a component of system 100 and communicates and receives data from client 112. Although FIG. 1 illustrates, for purposes of example, a particular number and type of clients 112, alternative embodiments of system 100 may include any appropriate number and type of clients 112, depending on the particular configuration of system 100.

In an embodiment, client 112 communicates second data over network 102, which includes criteria for filtering first data related to the operation of mail processing devices 108. Second data may identify a subset of one or more categories of first data. For example, second data may identify the subset of operators at a particular site 110 who had jam clear rates greater than 15 seconds. Client 112 may communicate second data through a graphical user interface (GUI), which may be part of an application running on client 112 or on reporting module 114. Examples of GUIs for communicating second data are described in more detail below with respect to FIGS. 4A-B.

Reporting modules 114 represent any suitable component of system 100 that facilitates receiving, storing, filtering, and/or communicating data. Reporting modules 114 may also be operable to generate reports based on filtered data. In some embodiments, reporting modules 114 may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of reporting modules 114 may be performed by any suitable combination of one or more servers or other components at one or more locations. In an embodiment where reporting modules 114 are servers, the server may be a private server, and the server may be a virtual or physical server. Additionally, reporting modules 114 may include any suitable component that functions as a server.

In the illustrated embodiment, reporting modules 114 includes memory 116, database 118, processor 120, and interface 122. Memory 116 represents any device operable to store, either permanently or temporarily, data, operational software, or other information for processor 128. Memory 116 includes any one or a combination of volatile or non-volatile local or remote devices suitable for storing information. For example, memory 116 may include random access memory (RAM), read only memory (ROM), magnetic storage devices, optical storage devices, semiconductor storage devices, or any other suitable information storage device or a combination of these devices. Memory 116 may include any suitable information for use in the operation of reporting module 114. Memory 116 may include some or all of database 118. Database 118 represents one or more databases operable to receive, store, filter, and/or communicate data associated with mail processing devices 108. In certain embodiments, each database 118 is associated with a mail processing site 110 and stores data related to the performance of mail processing devices 108 at the mail processing site 110.

Processor 120 represents any computing device configured to control the operation of reporting modules 114. Processor 120 may comprise one or more processors and may be a programmable logic device, a microcontroller, a microprocessor, any suitable processing device, or any suitable combination of the preceding. Processor 120 includes any hardware and/or software that operates to control and process information received by reporting module 114. In an embodiment, processor 120 communicatively couples to memory 116, database 118, and interface 122 and controls the operation of reporting module 114.

Interface 122 represents any device operable to receive input, send output, process the input and/or output and/or performs other suitable operations for reporting modules 114. Interface 122 includes any port or connection, real or virtual, including any suitable hardware and/or software, including protocol conversion and data processing capabilities, to communicate through network 102 that allows reporting modules 114 to exchange information with components of system 100 over network 102. In an embodiment, interface 122 may receive data relating to the operation of mail processing devices 108 from network 102.

Mail services vendor module 106 represents any suitable component of system 100 that facilitates receiving, storing, filtering, and/or communicating first data. In some embodiments, mail services vendor module 106 may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of mail services vendor module 106 may be performed by any suitable combination of one or more servers or other components at one or more locations. In an embodiment where mail services vendor module 106 is a server, the server may be a private server, and the server may be a virtual or physical server. Additionally, mail services vendor module 106 may include any suitable component that functions as a server.

In the illustrated embodiment, mail services vendor module 106 includes memory 124, database 126, processor 128, and interface 130. Memory 124 represents any device operable to store, either permanently or temporarily, data, operational software, or other information for processor 128. Memory 124 includes any one or a combination of volatile or non-volatile local or remote devices suitable for storing information. For example, memory 124 may include RAM, ROM, magnetic storage devices, optical storage devices, semiconductor storage devices, or any other suitable information storage device or a combination of these devices. Memory 124 may include any suitable information for use in the operation of mail services vendor module 106. Memory 124 may include some or all of database 126. Database 126 represents one or more databases operable to receive, store, filter, and/or communicate data associated with mail processing devices 108.

Processor 128 represents any computing device configured to control the operation of mail services vendor module 106. Processor 128 may comprise one or more processors and may be a programmable logic device, a microcontroller, a microprocessor, any suitable processing device, or any suitable combination of the preceding. Processor 128 includes any hardware and/or software that operates to control and process information received by mail services vendor module 106. In an embodiment, processor 128 communicatively couples to memory 124, database 126, and interface 130 and controls the operation of mail services vendor module 106.

Interface 130 represents any device operable to receive input, send output, process the input and/or output and/or performs other suitable operations for mail services vendor module 106. Interface 130 includes any port or connection, real or virtual, including any suitable hardware and/or software, including protocol conversion and data processing capabilities, to communicate through network 102 that allows mail services vendor module 106 to exchange information with components of system 100 over network 102. In an embodiment, interface 130 may receive data relating to the operation of mail processing devices 108 from network 102.

Components of system 100 may include logic. Logic performs the operation of the component, for example, logic executes instructions to generate output from input. Logic may include hardware, software, and/or other logic. Logic may be encoded in one or more non-transitory, tangible media, such as a computer-readable medium or any other suitable tangible medium, and may perform operations when executed by a computer. Certain logic, such as a processor, may manage the operation of a component.

In an embodiment of operation, reporting modules 114 receive first data from network 102 communicated by one or more mail processing devices 108 and/or mail services vendor module 106, receives second data from network 102 communicated by one or more clients 112, filters the first data with the second data, generates one or more reports based on the filtered first data, and communicates the one or more reports over network 102. Clients 112 may receive the reports from network 102, and enterprise 104 may use the reports to evaluate mail processing device 108, operator, and/or manager performance. In certain embodiments, enterprise 104 uses reports to identify maintenance issues relating to mail processing devices 108. In an embodiment, mail services vendor module 106 receives first data from network 102 and reporting modules 114 access first data from network 102 through mail services vendor module 106. In another embodiment, reporting modules 114 receive first data from network 102 without using mail services vendor module 106.

Modifications, additions, or omissions may be made to system 100. System 100 may include more, fewer, or other components. Any suitable component of system 100 may include a processor, interface, logic, memory, and/or other suitable element. In certain embodiments, first data may originate at mail processing devices 108 and/or mail services vendor module 106.

Figure 2:
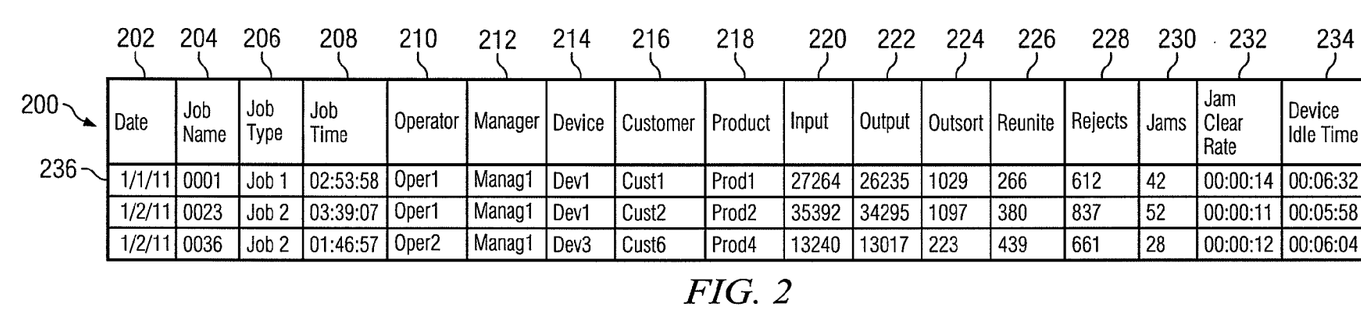
FIG. 2 illustrates an embodiment of a database comprising a table of data associated with the performance of mail processing devices.

FIG. 2 illustrates an embodiment of a database comprising table 200 of data associated with the operation of mail processing devices 108. In the illustrated embodiment, table 200 includes columns of data categories such as date column 202, job name column 204, job type column 206, job time column 208, operator column 210, manager column 212, device column 214, customer column 216, product column 218, input column 220, output column 222, outsort column 224, reunite column 226, rejects column 228, jams column 230, jam clear rate 232, and device idle time column 234.

In an embodiment of operation, system 100 stores first data related to the operation of mail processing devices 108 at mail processing site 110 in table 200 in database 118 associated with the mail processing site 110. First data may relate to performance data of mail processing devices 108, operators, or managers. Mail processing device 108 performance data includes jam rate, reunite rate, reject rate, outsort rate, and/or output rate. Operator performance data includes jam clear rate and/or device idle time. Reporting modules 114 may filter the data in table 200, and/or generate reports based on the data in table 200. System 100 may use data in table 200 to evaluate the performance of mail processing device 108, an operator, and/or a manager. For example, mail processing device 108 may record the number of articles processed by mail processing device 108 and the total number of jams during that period of time, but may not perform the calculation to determine the number of articles processed per jam (i.e., a jam rate). In certain embodiments, system 100 uses data from mail processing devices 108 to calculate additional data that may be useful for evaluating mail processing device 108, operator, and/or manager performance. For example, calculated data may include rates (e.g., output/unit time), performance metrics (e.g., jams/operator), or any other performance data calculated using data from mail processing devices 108. The first data may include calculated data and may be filtered by second data.

Date column 202 provides the dates that mail processing devices 108 processed particular batches of articles, referred to as jobs. Jobs may be associated with particular articles, customers, types of mail processing, or other category. Job name column 204 provides identification codes for particular jobs. Job type column 206 provides identification codes for particular categories of jobs. Job time column 208 provides the time mail processing device 108 operated processing a particular job. Operator column 210 provides identification codes for particular operators of mail processing devices 108. Manager column 212 provides identification codes for particular managers that supervised operators that controlled mail processing devices 108. Device column 214 provides identification codes for particular mail processing devices 108. Customer column 216 provides identification codes for particular categories of products processed by mail processing devices 108. In an embodiment, customer identification codes identify entities that sponsor the processing of particular products by mail processing devices 108. Product column 218 provides identification codes for particular categories of articles processed by mail processing devices 108. Products may be associated with particular articles, customers, types of mail processing, or other category.

Input column 220 provides the number of articles input into mail processing devices 108. Output column 222 provides the number of articles successfully processed by mail processing device 108. In an embodiment, output excludes outsorts, reunites, and rejects. Outsort column 224 provides the number of articles, such as envelopes or packages, that could not be opened by mail processing device 108. Mail processing device 108 may receive pre-defined criteria that determine what articles mail processing device 108 should outsort. For example, criteria may include article overlap in mail processing device 108, articles are too close together, article has incorrect dimensions, article has a change in thickness, mail processing device 108 error, metal detected in an article, damage to an article, or other suitable criteria. Reunite column 226 provides the number of articles, such as documents, that were not fully extracted from an envelope or package by mail processing device 108. Reject column 228 provides the number of articles, such as documents, that could not be processed by mail processing device 108 because of the orientation of the article, an error in the article, an error reading the article, and/or an error imaging the article.

Jam column 230 provides the number of obstructions that occurred in mail processing device 108 during operation. A jam may result from a malfunction of mail processing device 108, an operator error, or a defect in an article being processed. In certain embodiments, mail processing devices 108 shut down until a jam is cleared. A jam may include an article getting caught in mail processing device 108 and/or a portion of mail processing device 108 that needs to be reset. For mail processing device 108 to operate efficiently, jams need to be cleared from mail processing device 108. In certain embodiments, mail processing device 108 operators clear jams from mail processing device 108. Jam clear rate column 232 indicates the amount of time taken to clear a jam from mail processing device 108. In an embodiment, jam clear rate represents an average time taken to clear jams from mail processing device 108 over a period of time or number of articles processed. Device idle time column 234 indicates the amount of time mail processing device 108 was turned on but not processing articles. In an embodiment, remaining idle time excludes the time between turning mail processing device 108 on and when mail processing device 108 is able to process articles (i.e., the startup time of mail processing device 108).

Table 200 may further include data such as type of mail processing device, outsort rate, jam rate, jam time, reunite rate, reject rate, output rate, effective throughput, stops, total device time, or other type of data related to mail processing device operation useful to measure device, operator, and/or manager performance. Device type represents a category of mail processing devices 108. Outsort rate represents a measurement of the number of outsorts occurring in mail processing device 108. Outsort rate may include articles processed per outsort, a time mail processing device 108 operates per outsort, or any other suitable metric for monitoring the occurrence of outsorts in mail processing device 108. In an embodiment, outsort rate is expressed as the percentage of articles handled by mail processing device 108 that were outsorts. Jam rate represents a measurement of the number of jams occurring in mail processing device 108. Jam rate may include articles processed per jam, time mail processing device 108 operates per jam, or any other suitable metric for monitoring the occurrence of jams in mail processing device 108. Jam time represents the total amount of time a mail processing device 108 spent jammed. Reunite rate represents a measurement of the number of reunites occurring in mail processing device 108. Reunite rate may include articles processed per reunite, time mail processing device 108 operates per reunite, or any other suitable metric for monitoring the occurrence of reunites in mail processing device 108. In an embodiment, reunite rate is expressed as the percentage of articles handled by mail processing device 108 that were reunites. Reject rate represents a measurement of the number of rejects occurring in mail processing device 108. Reject rate may include articles processed per reject, time mail processing device 108 operates per reject, or any other suitable metric for monitoring the occurrence of rejects in mail processing device 108. Output rate represents a measurement of the number of articles successfully processed by mail processing device 108. Output rate may include articles processed per unit time of mail processing device operation, for example, per hour. Effective throughput represents a measure of the number of articles successfully processed by a mail processing device 108. In an embodiment, effective throughput represents the number of articles successfully processed per hour. Stops represent the number of times a mail processing device 108 stopped processing articles. Total device time represents the total amount of time a mail processing device operated.

Row 236 represents an embodiment of filtered first data that includes data related to a particular mail processing job. Row 236 includes the date the job was processed (1/1/11), the job name (0001), the job type (Job 1), the amount of time mail processing device 108 operated to process the job (02:53:58), the operator who processed the job (Oper1), the manager who supervised the operator (Manag1), the particular mail processing device 108 that processed the job (Dev1), the product involved in the mail processing job (Prod1), the number of articles input into mail processing device 108 as part of the job (27,264), the number of articles successfully processed by mail processing device 108 as part of the job (26,235), the number of articles that were outsorts (1029), the number of articles that were reunites (266), the number of articles that were rejects (612), the number of times mail processing device 108 jammed during the job (42), the average time it took the operator to clear the jams from mail processing device 108 (00:00:14), and the amount of time mail processing device 108 was turned on, but not processing, during the job (00:06:32). Row 236 could include more, fewer, or other data columns. In certain embodiments, the data columns included in row 236 are identified from second data received from clients 112.

Modifications, additions, or omissions may be made to table 200. Table 200 may include more, fewer, or different column fields. Table 200 may include any data useful in monitoring the performance of mail processing device 108, operator, or operator manager performance. Table 200 may also include any combination of column fields, any number of rows, or any number of columns.

Figure 3:
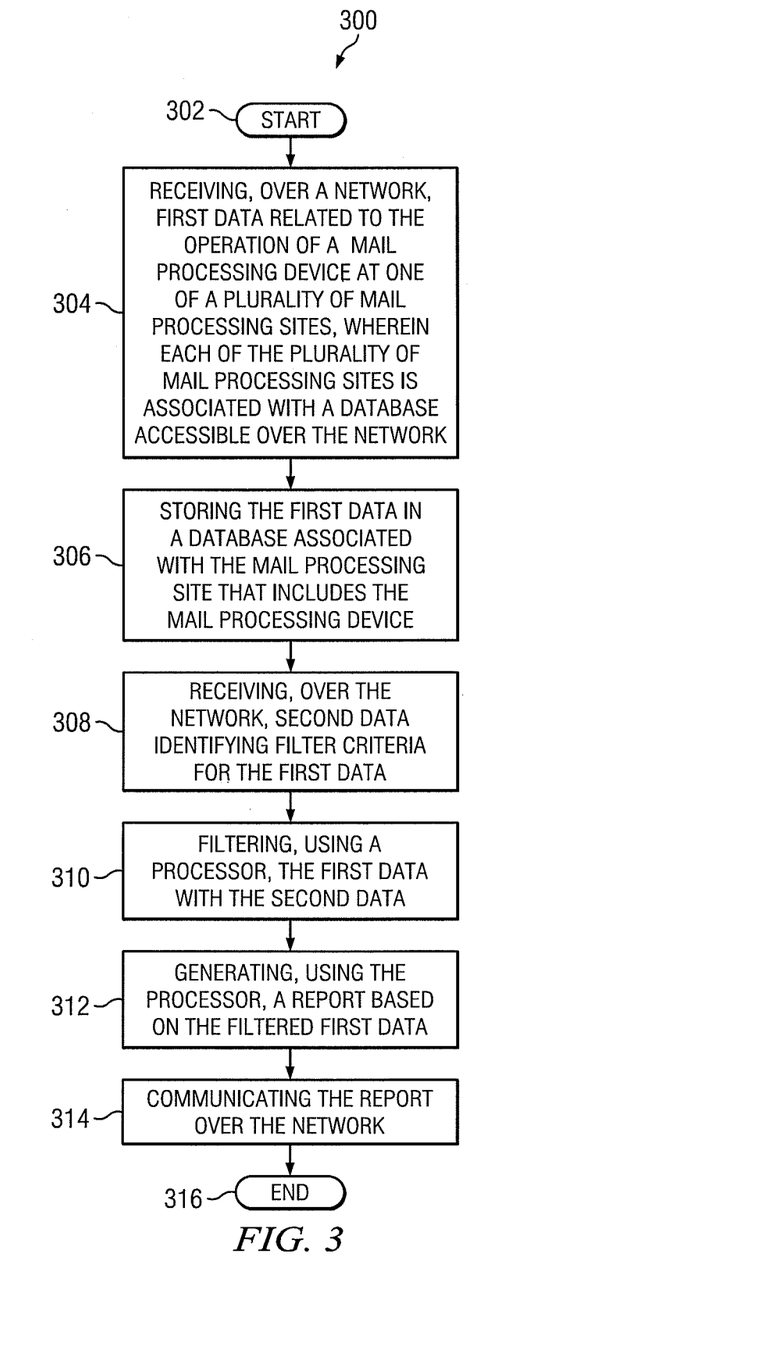
FIG. 3 illustrates a flow chart of an embodiment of a method for processing data associated with the performance of mail processing devices.

FIG. 3 illustrates a flow chart of an embodiment of method 300 for processing data associated with the operation of mail processing devices. Method 300 begins at step 302. At step 304, reporting module 114, receives, over network 102, first data related to the operation of mail processing devices 108, wherein each of the plurality of mail processing sites 110 is associated with a database 118 of reporting modules 114 accessible over network 102. In an embodiment, mail services vendor module 106 and/or mail processing device 108 communicates the first data to reporting module 114 associated with the mail processing site 110 of the mail processing device 108 that originated the data. First data may indicate performance metrics of mail processing devices 108. At step 306, reporting module 114 stores the first data in database 118 associated with the mail processing site 110 of the mail processing device 108 that originated the data.

At step 308, reporting module 114 receives, over network 102, second data identifying filter criteria for the first data. In an embodiment, reporting module 114 receives second data from one or more clients 112. At step 310, reporting module 114 filters, using processor 120, the first data with the second data. At step 312, reporting module 114 generates, using processor 120, a report based on the filtered first data. At step 314, reporting module 114 communicates the report over network 102. Method 300 ends at step 316.

Modifications, additions, or omissions may be made to method 300. The method may include more, fewer, or other steps. Additionally, steps may be performed in any suitable order. Any suitable component of system 100 may perform one or more steps of method 300. For example, in an embodiment, mail services vendor 106 may perform one or more of steps described as being performed by reporting module 114, and database 126 may perform one or more of the steps described as being performed by database 118.

Figure 4A:
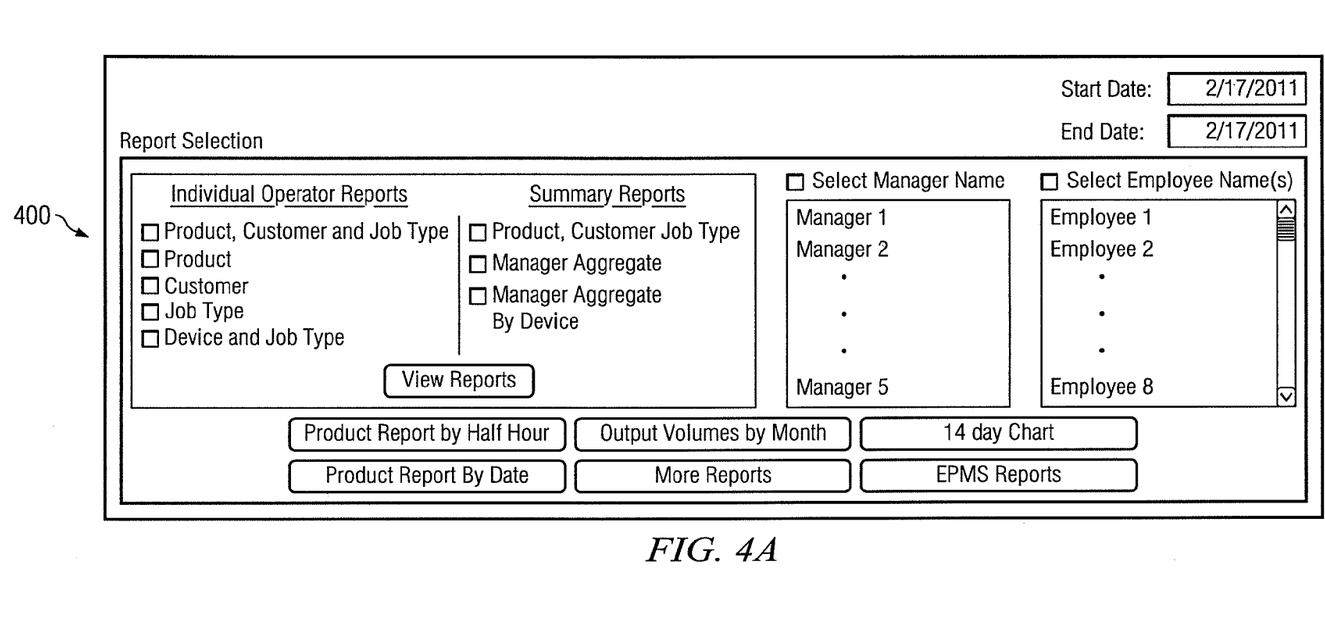
FIGS. 4A-B illustrate embodiments of graphical user interfaces.
Figure 4B:
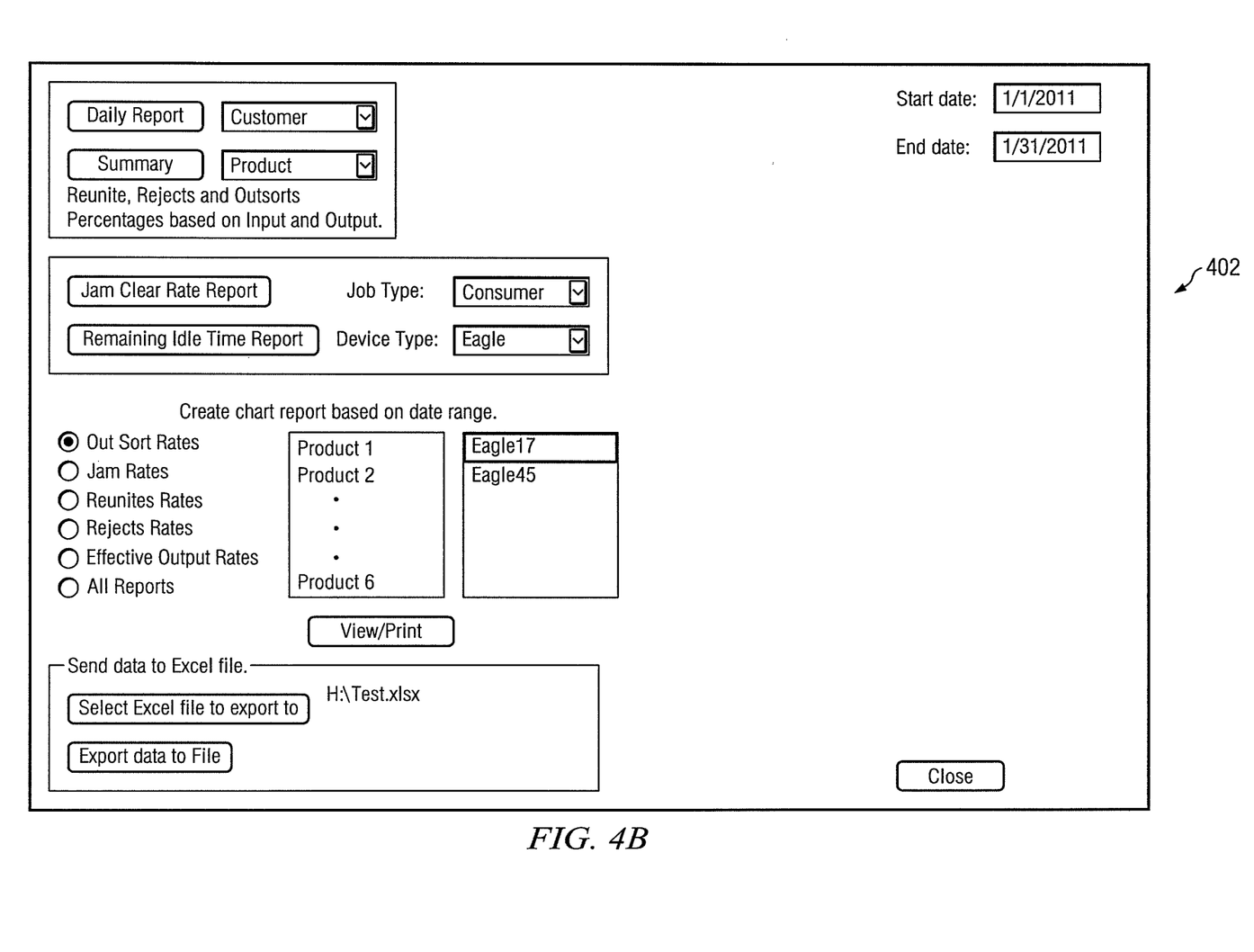

FIGS. 4A-B illustrate embodiments of graphical user interfaces (GUIs) for communicating second data. FIG. 4A illustrates an embodiment of GUI 400. In the embodiment, client 112 may select a date range, one or more manager names, and/or one or more operator names to include in a report. Client 112 may further select Individual Operator Reports and/or Summary Reports that include categories of data such as product, client, job type, and device. GUI 400 further provides client 112 other reporting options such as Product Reports by Half Hour, Output Volumes by Month, 14 Day Chart, Product Report by Date, Employee Performance Management System Reports, and an option to view More Reports.

FIG. 4B illustrates an embodiment of GUI 402. In the embodiment, client 112 can select a date range, customer type, customer, product, job type, device type, and device to include in a report. Client 112 may further select whether to include various data such as outsort rates, jam rates, reunite rates, reject rates, and/or output rates. GUI 402 further provides client 112 reporting options that include Daily Report, Summary, Jam Clear Rate Report, and Remaining Idle Time Report. In an embodiment, GUI 402 allows client 112 to export data used to create a report to a Microsoft Excel file.

Modifications, additions, or omissions may be made to interfaces 400 and 402. Interfaces 400 and 402 may include more, fewer, or other fields for receiving second data or more, fewer, or other options for reports. GUIs 400 and 402 may further communicate with any suitable component of system 100.

Figure 5A:
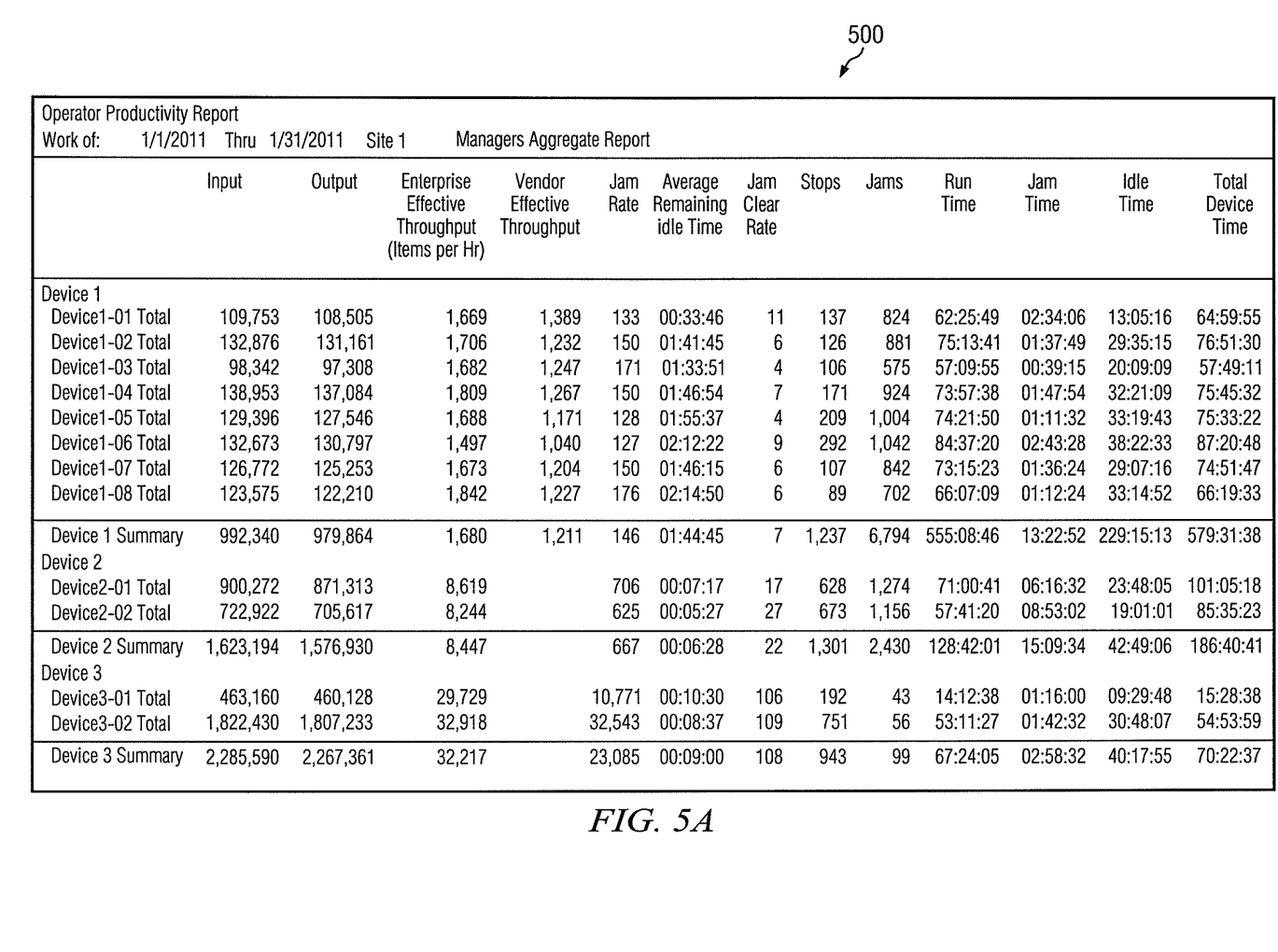
FIGS. 5A-C illustrate embodiments of reports generated by the system.
Figure 5B:
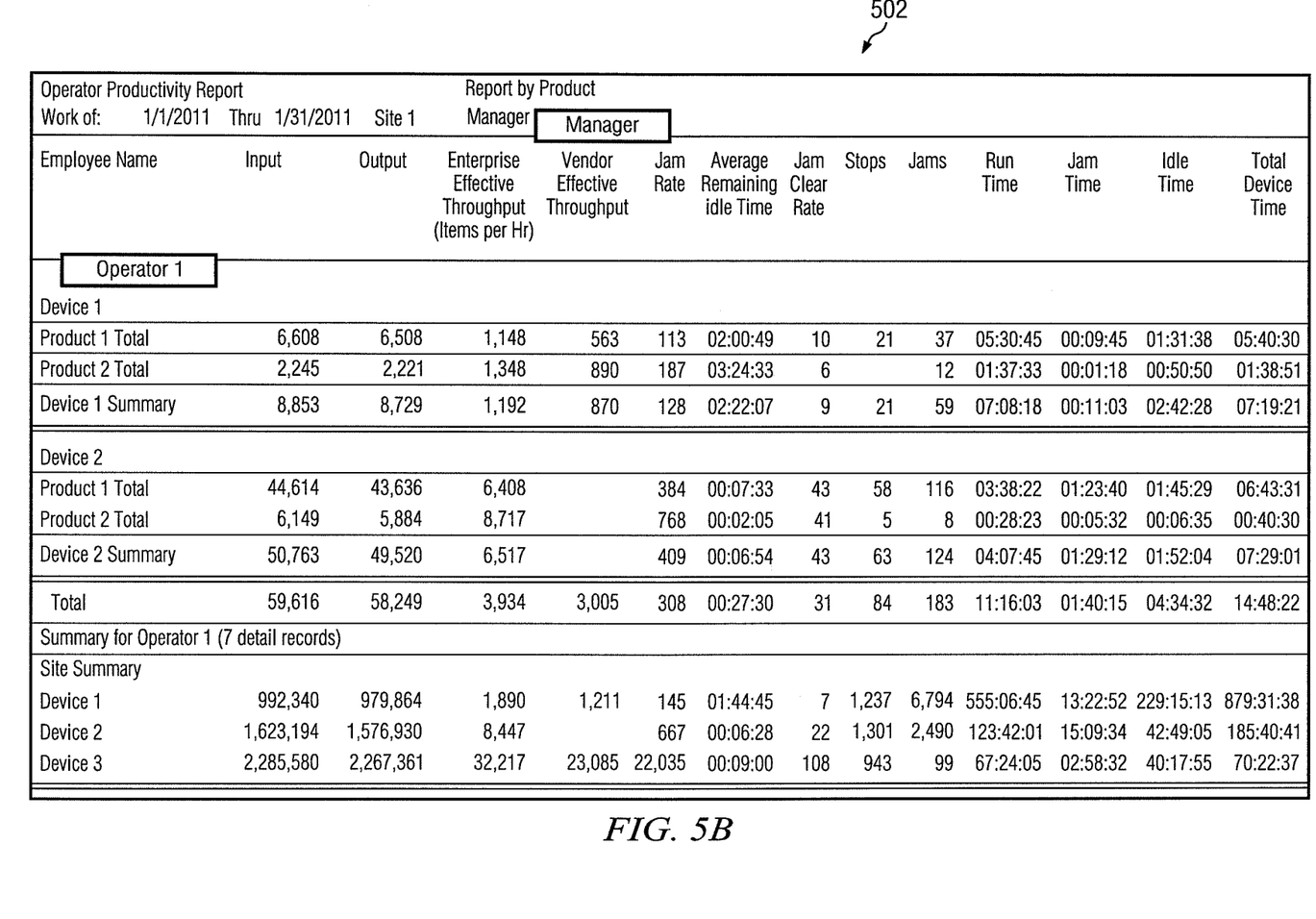
Figure 5C:
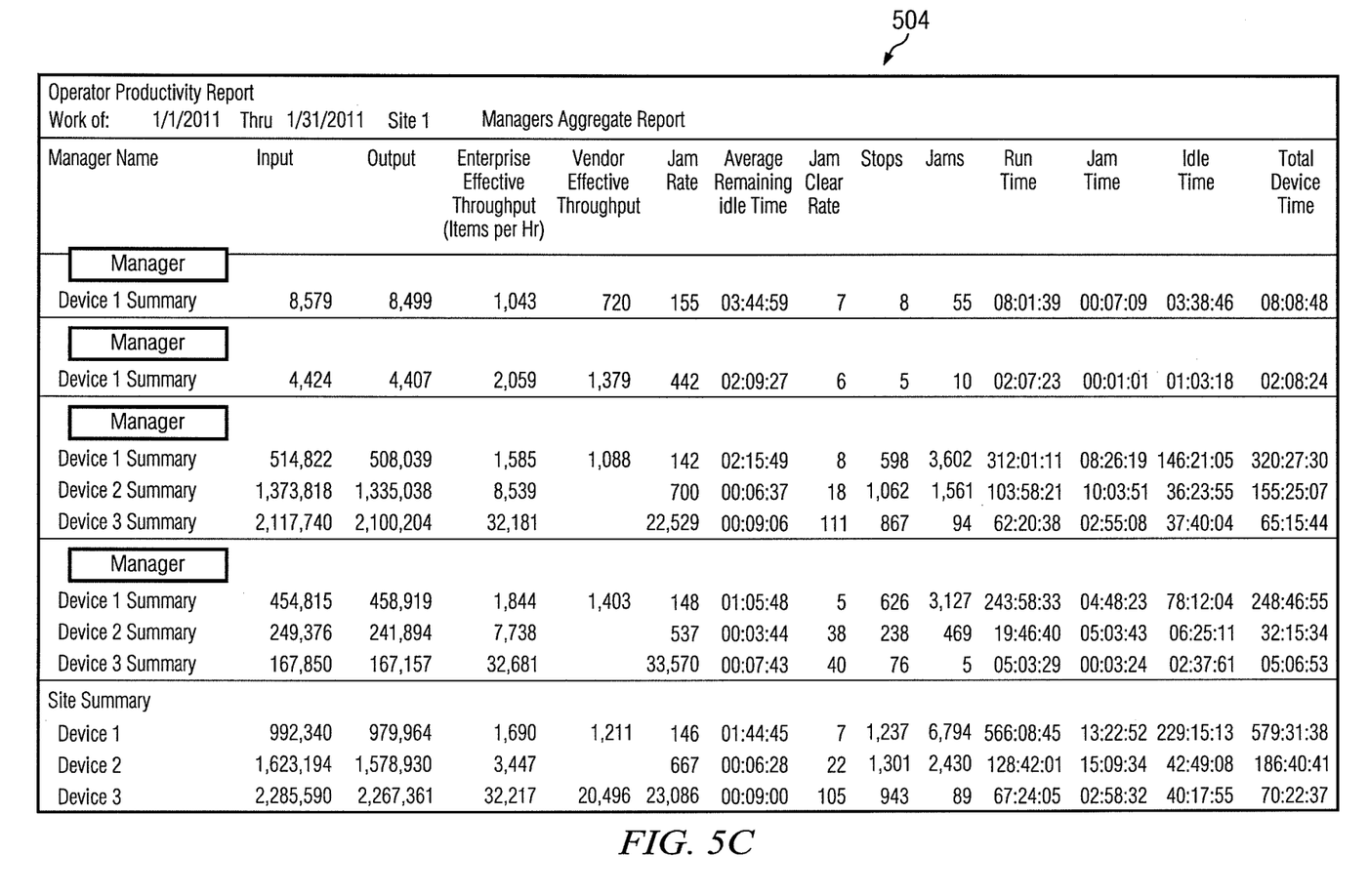

FIGS. 5A-C illustrate embodiments of generated reports of first data filtered by second data. FIG. 5A illustrates report 500 which displays data related to mail processing device 108 performance. Report 500 includes input, output, effective throughput, vendor effective throughput, jam rate, average remaining idle time, jam clear rate, stops, jams, run time, jam time, idle time, and total device time for a number of mail processing devices at a particular mail processing site over a particular date range. Enterprise 104 may use report 500 to evaluate mail processing device 108 performance, identify maintenance issues in mail processing devices 108, or other purpose.

FIG. 5B illustrates report 502 which displays data related to operator performance. Report 502 includes input, output, effective throughput, vendor effective throughput, jam rate, average remaining idle time, jam clear rate, stops, jams, run time, jam time, idle time, and total device time for a particular operator over a particular date range. Report 502 further includes the operator's manager, the particular devices operated by the operator, the products processed by the operator on the particular devices. Enterprise 104 may use report 502 to evaluate operator performance, compare operator performance, evaluate site 110 performance, or other purpose.

FIG. 5C illustrates report 504 which displays data related to manager performance. Report 504 includes input, output, effective throughput, vendor effective throughput, jam rate, average remaining idle time, jam clear rate, stops, jams, run time, jam time, idle time, and total device time for a particular operator over a particular date range. Report 504 further includes a number of managers of a particular mail processing site 110, the particular mail processing devices 108 operated under the supervision of the managers, and a summary of mail processing device 108 performance at site 110. Enterprise 104 may use report 504 to evaluate manager performance, comparing manger performance, evaluating site 110 performance, or other purpose.

Modifications, additions, or omissions may be made to reports 500, 502, and 504. Reports 500, 502, and 504 may include more, fewer, or other fields. Reports 500, 502, and 504 may display more, fewer, or other first data and may filter the first data with more, fewer or other second data. Reports 500, 502, and 504 may be generated in any suitable format and may include data tables, such as table 200. Reports 500, 502, and 504 may be dynamic, allowing a user to further manipulate data in the report, or static.

Although the present disclosure has been described with several embodiments, diverse changes, substitutions, variations, alterations, and modifications may be suggested to one skilled in the art, and it is intended that the disclosure encompass all such changes, substitutions, variations, alterations, and modifications as fall within the spirit and scope of the appended claims.

What is claimed is:

1. A system for analyzing performance data associated with a mail processing device, comprising:
a hardware interface configured to receive, over a network, first data related to the operation of a mail processing device at one of a plurality of mail processing sites, wherein each of the plurality of mail processing sites is associated with a database accessible over the network;
a processor communicatively coupled to the interface and configured to:
store the first data in a database associated with the mail processing site that includes the mail processing device; and
calculate device performance data and operator performance data from the received first data, wherein the calculated device and operator performance data includes:
an outsort rate representing a number of articles that were not successfully opened by the mail processing device per unit time;
a reunite rate representing a number of articles that were not successfully extracted by the mail processing device per unit time; and
a device idle time representing the amount of time between when an operator turns the mail processing device on and the time the mail processing device begins processing articles, excluding the time it takes for the mail processing device to startup;
the interface further configured to receive, over the network, second data identifying filter criteria for the first data;
the processor further configured to:
filter the first data with the second data;
generate a report based on the filtered first data that includes the calculated outsort rate and the calculated reunite rate; and
the interface further configured to communicate the report over the network.

2. The system of claim 1, the interface further configured to receive the first data from a mail services vendor database configured to store the first data received from the mail processing device.

3. The system of claim 1, wherein a mail processing device includes at least one from the set comprising: mail opening devices, mail sorting devices, mail extracting devices, mail inserting devices, scanning devices, folding devices, imaging devices, and data capture devices.

4. The system of claim 1, wherein the first data includes at least one from the set comprising: mail processing device type, number of jams, number of reunites, number of rejects, number of outsorts, input, and output.

5. The system of claim 1, the processor further configured to calculate manager performance data according to the first data.

6. A non-transitory computer readable medium comprising logic for analyzing performance data associated with a mail processing device, the logic, when executed by a processor, configured to:
receive, over a network, first data related to the operation of a mail processing device at one of a plurality of mail processing sites, wherein each of the plurality of mail processing sites is associated with a database accessible over the network;
store the first data in a database associated with the mail processing site that includes the mail processing device;
calculate device performance data and operator performance data from the received first data, wherein the calculated device and operator performance data includes:
an outsort rate representing a number of articles that were not successfully opened by the mail processing device per unit time;

a reunite rate representing a number of articles that were not successfully extracted by the mail processing device per unit time; and a device idle time representing the amount of time between when an operator turns the mail processing device on and the time the mail processing device begins processing articles, excluding the time it takes for the mail processing device to startup;

receive, over the network, second data identifying filter criteria for the first data;

filter the first data with the second data;

generate, using a processor, a report based on the filtered first data that includes the calculated outsort rate and the calculated reunite rate; and communicate the report over the network.

7. The computer readable medium of claim 6, further configured to receive the first data from a mail services vendor database configured to store the first data received from the mail processing device.

8. The computer readable medium of claim 6, wherein a mail processing device includes at least one from the set comprising: mail opening devices, mail sorting devices, mail extracting devices, mail inserting devices, scanning devices, folding devices, imaging devices, and data capture devices.

9. The computer readable medium of claim 6, wherein the first data includes at least one from the set comprising: mail processing device type, number of jams, number of reunites, number of rejects, number of outsorts, input, and output.

10. The computer readable medium of claim 6, the logic, when executed by the processor, further configured to calculate manager performance metrics according to the first data.

11. A method for analyzing performance data associated with a mail processing device, comprising:

receiving, over a network, first data related to the operation of a mail processing device at one of a plurality of mail processing sites, wherein each of the plurality of mail processing sites is associated with a database accessible over the network;

storing the first data in a database associated with the mail processing site that includes the mail processing device;

calculate device performance data and operator performance data from the received first data, wherein the calculated device and operator performance data includes:

an outsort rate representing a number of articles that were not successfully opened by the mail processing device per unit time;

a reunite rate representing a number of articles that were not successfully extracted by the mail processing device per unit time; and a device idle time representing the amount of time between when an operator turns the mail processing device on and the time the mail processing device begins processing articles, excluding the time it takes for the mail processing device to startup;

receiving, over the network, second data identifying filter criteria for the first data;

filtering, using a processor, the first data with the second data;

generating, using a processor, a report based on the filtered first data that includes the calculated outsort rate and the calculated reunite rate; and communicate the report over the network.

12. The method of claim 11, further comprising receiving the first data from a mail services vendor database configured to store the first data received from the mail processing device.

13. The method of claim 11, wherein a mail processing device includes at least one from the set comprising: mail opening devices, mail sorting devices, mail extracting devices, mail inserting devices, scanning devices, folding devices, imaging devices, and data capture devices.

14. The method of claim 11, wherein the first data includes at least one from the set comprising: mail processing device type, number of jams, number of reunites, number of rejects, number of outsorts, input, and output.

15. The method of claim 11, further comprising calculating, using the processor, manager performance metrics according to the first data.

\* \* \* \* \*